(12) United States Patent
Sueoka et al.

(10) Patent No.: US 8,467,989 B2
(45) Date of Patent: Jun. 18, 2013

(54) CLEARANCE MEASURING METHOD AND MEASURING UNIT

(75) Inventors: Hisayuki Sueoka, Tokyo (JP); Hiroshi Yoshida, Tokyo (JP); Tatsumi Otomura, Tokyo (JP); Hiroya Mitsushima, Tokyo (JP)

(73) Assignee: Hirata Corporation, Tokyo (JP)

( * ) Notice: Subject to any disclaimer, the term of this patent is extended or adjusted under 35 U.S.C. 154(b) by 338 days.

(21) Appl. No.: 12/935,143

(22) PCT Filed: Mar. 29, 2008

(86) PCT No.: PCT/JP2008/056248
§ 371 (c)(1),
(2), (4) Date: Dec. 6, 2010

(87) PCT Pub. No.: WO2009/122475
PCT Pub. Date: Oct. 8, 2009

(65) Prior Publication Data
US 2011/0264403 A1    Oct. 27, 2011

(51) Int. Cl.
*G06F 15/00*    (2006.01)
(52) U.S. Cl.
USPC ............................... 702/150; 33/611; 33/613
(58) Field of Classification Search
USPC .................. 702/150; 33/657, 531, 611, 836, 33/613; 73/114.77, 114.79, 19.02, 19.03, 73/19.05
See application file for complete search history.

(56) References Cited

U.S. PATENT DOCUMENTS

| | | | | |
|---|---|---|---|---|
| 3,829,979 A | * | 8/1974 | Stewart | 33/611 |
| 3,968,569 A | * | 7/1976 | Faris | 33/655 |
| 4,063,167 A | * | 12/1977 | Duly | 324/671 |
| 4,395,827 A | * | 8/1983 | Stowe et al. | 33/655 |
| 4,471,531 A | * | 9/1984 | Gunderson | 33/657 |
| 5,335,547 A | * | 8/1994 | Nakajima et al. | 73/622 |
| 5,649,369 A | * | 7/1997 | Thoren | 33/655 |
| 6,886,267 B1 | * | 5/2005 | Karwowski et al. | 33/613 |
| 7,121,525 B2 | * | 10/2006 | Gelez | 251/129.19 |
| 7,891,938 B2 | * | 2/2011 | Herron et al. | 415/1 |
| 7,984,560 B2 | * | 7/2011 | Esslinger | 33/542.1 |
| 2002/0167311 A1 | * | 11/2002 | Dzieciol et al. | 324/207.25 |

FOREIGN PATENT DOCUMENTS

| | | |
|---|---|---|
| DE | 199 58 090 | 6/2001 |
| FR | 2 255 575 | 7/1975 |
| JP | 63-196801 | 8/1988 |

\* cited by examiner

*Primary Examiner* — Carol Tsai
(74) *Attorney, Agent, or Firm* — Bacon & Thomas, PLLC

(57) ABSTRACT

The present invention provides a method for measuring a clearance (13) between facing surfaces of a first member (11) and a second member (12). The method includes a step (S1) of bringing a pair of probes each having a tip end (14) slightly larger than the clearance (13) into direct contact with the clearance (13) and measuring a separation distance between the two tip ends (14), and a calculating step (S2) of calculating and measuring a clearance value (d1) on the basis of the separation distance between the tip ends (14).

14 Claims, 7 Drawing Sheets

(a)

(b)

US 8,467,989 B2

CLEARANCE MEASURING METHOD AND MEASURING UNIT

TECHNICAL FIELD

The present invention relates to a measuring method and a measuring unit for measuring clearance, and more particularly to a measuring method and a measuring unit for measuring the valve clearance of a reciprocating engine.

BACKGROUND ART

A reciprocating engine has intake and exhaust valves for intake of air-fuel mixture and exhaust. At the time of intake and exhaust, the intake and exhaust valves are opened and closed. A cam shaft controls the opening and closing of the intake and exhaust valves.

Types of operation of opening the intake and exhaust valves by cams of the cam shaft are classified into a direct acting type in which cams directly press valve lifters for opening and closing valves, and a rocker arm type in which cams press valves via arms called rocker arms for opening and closing valves.

The intake and exhaust valves thermally expand because of heat from combustion chambers. When the valves thermally expand, intake and exhaust timings change accordingly. Thus, in order to absorb such thermal expansion, in a condition in which a cam does not press a valve lifter or a roller of a rocker arm, a clearance (valve clearance) is provided for adjustment between the cam and the valve lifter (or the roller of the rocker arm).

In assembly of an engine, usually, after assembly of the valves to a cylinder head, corresponding valve clearances are automatically adjusted by an adjusting apparatus. Subsequent to the adjustment, valve clearances are actually measured for confirmation.

Conventionally, a worker manually measures and confirms the valve clearance; specifically, he/she inserts a clearance gauge called a shim between the cam and the valve lifter (or the roller of the rocker arm). Such manual work is employed for the following reason. Since cam shafts, valve lifters, rocker arms, etc. are forgings, design accuracy on the order of μm is difficult to attain, and assembling accuracy differs among engines. Therefore, basically, automation is difficult.

According to a known valve clearance measuring apparatus for automatically measuring a valve clearance between a cam and a cam contact member of a valve, an attachment is brought into contact with a surface of the cam contact member, with which the cam of a cam shaft comes into contact, so as to use the surface as a reference plane; and, in a condition in which valve clearance VC is present between the reference plane and the lower end surface of the cam shaft, a valve clearance is measured from the difference between a cam shaft height D1 from the reference surface and a height D3 of the cam shaft itself (refer to Patent Document 1).

Patent Document 1: Japanese Patent Application Laid-Open (kokai) No. 2005-54728

DISCLOSURE OF THE INVENTION

Problems to be Solved by the Invention

The aforementioned measurement of valve clearance by manual work involves the following problem. Measured values vary depending on worker proficiency. Also, measurement by an unskilled worker increases tact time (work time).

Meanwhile, the valve clearance measuring apparatus described in Patent Document 1 automatically measures the valve clearance VC, but obtains the valve clearance VC from the aforementioned difference between D1 and D3. As mentioned previously, engine assembling accuracy differs among engines; therefore, a measured valve clearance cannot be said to be reliable unless the valve clearance is measured directly.

The present invention has been conceived in view of the above circumstances, and an object of the invention is to provide a measuring method and a measuring unit for directly measuring a very small clearance between two facing members.

Means for Solving the Problems

To achieve the above object, an invention according to claim 1 provides a clearance measuring method for measuring clearance between facing surfaces of a first member and a second member. The method comprises a step of bringing a pair of probes each having a tip end slightly larger than the clearance into direct contact with the facing surfaces and measuring a separation distance between the two tip ends, and a calculating step of calculating and measuring a clearance value on the basis of the separation distance between the tip ends.

An invention according to claim 2 provides a clearance measuring method for measuring clearance between facing circular surfaces of a first member and a second member each having the circular surface. The method comprises a step of bringing a pair of probes each having a round tip end slightly larger than the clearance into direct contact with the facing surfaces and measuring a center-to-center distance between the two tip ends, and a calculating step of calculating and measuring a clearance value on the basis of the center-to-center distance between the tip ends.

According to the above methods, the tip ends of the pair of probes are brought into direct contact with a very small clearance between the two facing members, and, on the basis of the center-to-center distance between the tip ends which is measured under the direct contact condition, the clearance value can be measured.

An invention according to claim 3 provides a clearance measuring method according to claim 2, wherein, in the calculating step, on the basis of a predetermined relationship between the center-to-center distance between the tip ends and the clearance value to be calculated and measured, a measured center-to-center distance between the tip ends is converted to the clearance value.

According to the above method, the center-to-center distance between the tip ends is measured, and a measured center-to-center distance can be converted to the clearance value by use of a relational expression. Therefore, the clearance value can be readily and simply obtained.

Inventions according to claims 4 to 6 provide a clearance measuring method according to claim 3, wherein radii r1 and r2 of the circular surfaces of the first member and the second member, respectively, and a radius e of the tip ends are predetermined; and, when 2Y represents the center-to-center distance between the tip ends, and d1 represents the clearance value, on the basis of the center-to-center distance 2Y between the tip ends, the clearance value d1 is obtained.

According to the above methods, when the radii r1 and r2 of the circular surfaces of the first and second members and the radius e of the tip ends are determined, and the center-to-center distance 2Y between the tip ends is measured, the clearance value is determined.

An invention according to claim 7 provides a clearance measuring method for measuring clearance between facing surfaces of a first member having a circular surface and a second member having a horizontal surface. The method comprises a step of bringing a pair of probes each having a round tip end slightly larger than the clearance into direct contact with the facing surfaces and measuring a center-to-center distance between the two tip ends, and a calculating step of calculating and measuring a clearance value on the basis of the center-to-center distance between the tip ends.

According to the above method, the tip ends of the pair of probes are brought into direct contact with a very small clearance between the two facing members, and, on the basis of the center-to-center distance between the tip ends which is measured under the direct contact condition, the clearance value can be measured.

An invention according to claim 8 provides a clearance measuring method according to claim 7, wherein, in the calculating step, on the basis of a predetermined relationship between the center-to-center distance between the tip ends and the clearance value to be calculated and measured, a measured value of the center-to-center distance between the tip ends is converted to the clearance value.

According to the above method, the center-to-center distance between the tip ends is measured, and a measured center-to-center distance can be converted to the clearance value by use of a relational expression. Therefore, the clearance value can be readily and simply obtained.

An invention according to claim 9 provides a clearance measuring method according to claim 8, wherein a radius r1 of the circular surface of the first member and a radius e of the tip ends are predetermined; and, when 2Y represents the center-to-center distance between the tip ends, and d4 represents the clearance value, on the basis of the center-to-center distance 2Y between the tip ends, the clearance value d4 is obtained.

According to the above method, when the radius r1 of the circular surface of the first member and the radius e of the tip ends are determined, and the center-to-center distance 2Y between the tip ends is measured, the clearance value is determined.

An invention according to claim 10 provides a clearance measuring unit for measuring clearance between facing circular surfaces of a first member and a second member each having the circular surface. The unit comprises a pair of probes adapted to be brought into direct contact with the facing surfaces and having respective round tip ends slightly larger than the clearance; moving means for moving the pair of probes to a position of the clearance or moving the first and second members to a position between the pair of probes; drive means connected to the pair of probes and adapted to open and close the probes; measuring means for measuring a center-to-center distance between the tip ends of the pair of probes; and calculating means for calculating a clearance value on the basis of a measured center-to-center distance between the tip ends. An invention according to claim 11 provides a clearance measuring unit for measuring clearance between facing surfaces of a first member having a circular surface and a second member having a horizontal surface. The unit comprises a pair of probes adapted to be brought into direct contact with the facing surfaces and having respective round tip ends slightly larger than the clearance; moving means for moving the pair of probes to a position of the clearance or moving the first and second members to a position between the pair of probes; drive means connected to the pair of probes and adapted to open and close the probes; measuring means for measuring a center-to-center distance between the tip ends of the pair of probes; and calculating means for calculating a clearance value on the basis of a measured center-to-center distance between the tip ends.

According to the above configurations, the tip ends of the pair of probes can be brought into direct contact with the position of a very small clearance between the two facing members, and, on the basis of the center-to-center distance between the tip ends which is measured under the direct contact condition, the clearance value can be measured.

An invention according to claim 12 provides a clearance measuring unit according to claim 10 or 11, wherein the pair of probes is held by an arch bracket, and the moving means which can move vertically is connected to the bracket.

According to the above configuration, by means of moving the moving means vertically, the pair of probes held by the bracket can be moved vertically.

An invention according to claim 13 provides a clearance measuring unit according to claim 12, wherein the drive means comprises a linear motion guide held by the bracket and supporting the pair of probes in such a manner as to allow opening and closing of the pair of probes; a tension spring held by the bracket, provided in parallel with the linear motion guide, and adapted to close the pair of probes; and a slide mechanism held by the moving means and adapted to open the pair of probes.

According to the above configuration, the pair of probes supported by the linear motion guide is closed by means of the tension spring and opened by means of the slide mechanism.

An invention according to claim 14 provides a clearance measuring unit according to claim 13, wherein the slide mechanism comprises an actuator provided unitarily with the moving means and adapted to provide vertically rectilinear driving and a rectilinear cam connected to the actuator and having a taper surface formed at a tip end thereof, and rollers are provided at facing inner side surfaces, respectively, of the pair of probes in such a manner as to be rollable along the taper surface of the rectilinear cam.

According to the above configuration, by virtue of a cam mechanism, a rectilinear driving motion of the slide mechanism can be converted to a driving motion of opening the pair of probes.

An invention according to claim 15 provides a clearance measuring unit according to claim 12, wherein the bracket has through holes extending therethrough in a vertical direction; pins are inserted through the respective through holes via respective compression springs urging the bracket upward in the vertical direction; the moving means which can move in the vertical direction is connected to projecting portions of the pins; and the bracket is provided in a floating condition by means of the pins.

According to the above configuration, a floating structure effected by the pins is imparted to the bracket, whereby the weight of the measuring unit can be partially canceled in the course of measurement of clearance. Therefore, the tip ends of the probes can be reliably fitted to the clearance.

An invention according to claim 16 provides a clearance measuring unit according to claim 10 or 11, wherein each of the tip ends assumes the form of a column having a substantially circular section, and peripheral surfaces of the substantially circular columns are brought into direct contact with the facing surfaces.

According to the above configuration, at the position of clearance, the tip ends are in surface contact, rather than point contact, with the members, so that the tip ends can be stably in contact with the clearance.

Effects of the Invention

According to the present invention, the tip ends of the pair of probes are brought into direct contact with clearance between two facing members; a separation distance between the tip ends is measured; and a clearance value is calculated and measured from the separation distance between the tip ends. Therefore, the present invention yields an excellent effect of obtaining a highly accurate clearance value.

BRIEF DESCRIPTION OF THE DRAWINGS

[FIG. 8] A pair of views for explaining a floating mechanism of a bracket in FIG. 6, wherein FIG. 8(a) shows a condition before floating, and FIG. 8(b) shows a condition after floating.

DESCRIPTION OF REFERENCE NUMERALS

| | | |
|---|---|---|
| 11: | first member | |
| 12: | second member | |
| 13: | clearance | |
| 14: | tip end | |
| S1: | measuring step | |
| S2: | calculating step | |
| d1: | clearance value | |

BEST MODE FOR CARRYING OUT THE INVENTION

A preferred embodiment of the present invention will next be described with reference to the appended drawings.
(First Embodiment)
FIG. 1 shows a diagram for explaining a clearance measuring method according to a preferred embodiment of the present invention.

Figure 1:
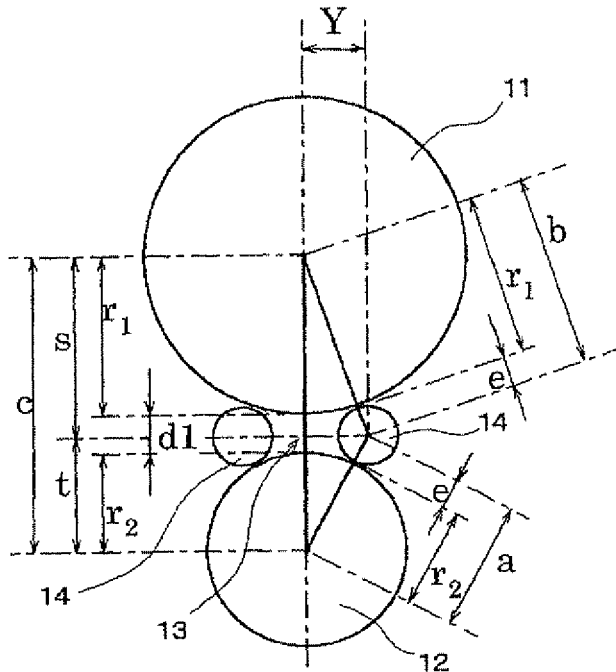
[FIG. 1] Diagram for explaining a clearance measuring method according to a first embodiment of the present invention.

As shown in FIG. 1, the clearance measuring method according to the present embodiment is for measuring clearance between facing surfaces of a first member and a second member; specifically, a very small clearance 13 between facing circular surfaces of a first member 11 and a second member 12 each having the circular surface. Examples of the first and second members 11 and 12 include circular columnar shafts, rollers, and bearings.

The measuring method includes a step (measuring step S1) of bringing a pair of probes (see probes 60 shown in FIG. 6, which will be described later) each having a round tip end 14 slightly larger than the clearance 13 into direct contact with the clearance 13 and measuring a center-to-center distance 2×Y (hereinafter, referred to as 2Y) between the two tip ends 14, and a step (calculating step S2) of calculating and measuring a clearance value d1 on the basis of the center-to-center distance 2Y between the tip ends 14.

In the measuring step S1, the pair of probes having the respective tip ends 14 is caused to approach each other while following the profile of the circular surface of the member 11 (and/or the profile of the circular surface of the member 12), until the pair of probes come into contact with the clearance 13 between the members 11 and 12. Upon establishment of the contact, the center-to-center distance 2Y between the tip ends 14 is obtained.

Access of the pair of probes to the clearance 13 is not limited to the mode in which the probes approach each other while following the profile of the circular surface of the member 11. The pair of probes may access the clearance 13 from any direction convenient for contact with the clearance 13; specifically, access may be from above, from below, from the left, or from the right.

Meanwhile, in the calculating step S2, on the basis of a predetermined relationship between the center-to-center distance 2Y between the tip ends 14 and the clearance value d1 to be calculated and measured, a measured value of the center-to-center distance 2Y between the tip ends 14 is converted to the clearance value d1.

Specifically, the calculating step S2 is as follows. Radii r1 and r2 of the circular surfaces of the first member 11 and the second member 12, respectively, and a radius e of the tip ends 14 are predetermined. When a represents a center-to-center distance between the second member 12 and the tip end 14, b represents a center-to-center distance between the first member 11 and the tip end 14, s represents a segment corresponding to a segment of length b and extending in a direction of extension of a center-to-center segment c between the first member 11 and the second member 12, t represents a segment corresponding to a segment of length a and extending in the direction of extension of the center-to-center segment c, and 2Y represents a center-to-center distance between the tip ends 14, on the basis of the center-to-center distance 2Y between the tip ends 14, the clearance value d1 is obtained by Expression 5 given below. The term "predetermined" means that, since the sizes or diameters of the first and second members 11 and 12 and the tip ends 14 of the probes to be used are predetermined, the predetermined sizes or diameters are applied.

[Expression 5]

When the radii r1 and r2 of the circular surfaces of the first member and the second member, respectively, and the radius e of the tip ends are predetermined, a represents a center-to-center distance between the second member and the tip end, b represents a center-to-center distance between the first member and the tip end, s represents a segment corresponding to a segment b between the center of the first member and the center of the tip end and extending in a direction of extension of a center-to-center segment c between the first member and the second member, t represents a segment corresponding to a segment a between the center of the second member and the center of the tip end and extending in the direction of extension of the center-to-center segment c, and 2Y represents a center-to-center distance between the tip ends, $$a = r2 + e \text{ and}$$

$$b = r1 + e;$$

from the Pythagorean theorem, there are obtained $$s^2 = b^2 - Y^2 \text{ and}$$

$$t^2 = a^2 - Y^2;$$

since c=s+t, there is obtained $$c = \sqrt{(b^2 - Y^2)} + \sqrt{(a^2 - Y^2)}; \text{ and}$$

since the clearance value d1 is represented by d1=c−(r1+r2), there is obtained $$d1 = \sqrt{(b^2 - Y^2)} + \sqrt{(a^2 - Y^2)} - (r1 + r^2).$$

For example, with r1=15 (mm), r2=9 (mm), and e=1.5 (mm), a=10.5 (mm) and b=16.5 (mm). Therefore, when a measured value of the center-to-center distance 2Y between the tip ends (e.g., 11.970 (mm)) is obtained, the clearance value d1 (e.g., 0.003 (mm)) is calculated accordingly. The relationship between a measured value 2Y and the clearance value d1 is expressed by a linear function; thus, when the measured value 2Y is obtained, the clearance value d1 is uniquely determined.

The measuring step S1 has been described while referring to an example in which the center-to-center distance 2Y is directly measured. However, the measuring step S1 may be as follows: first, the separation distance between the tip ends 14 is measured, and then two times the radius e (2e) is added to a measured separation distance to obtain the center-to-center distance 2Y (=separation distance+2e).

Next, modifications of the clearance measuring method are described.

(First Modification)

Figure 2:
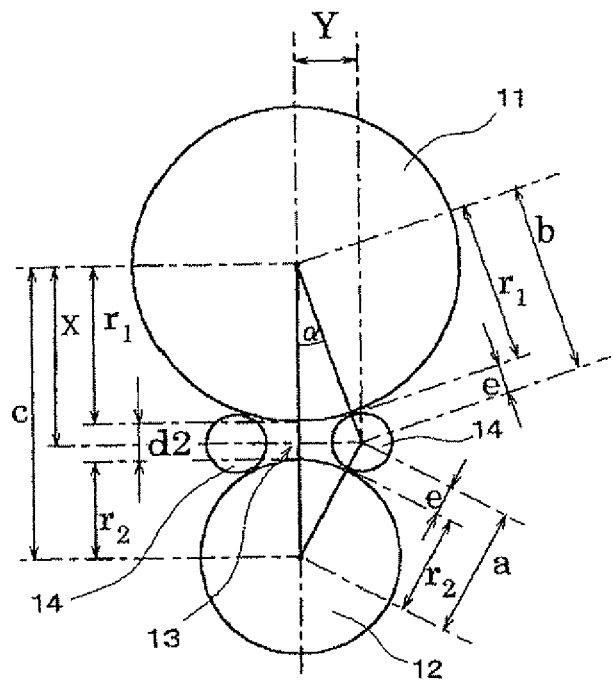
[FIG. 2] Diagram showing a first modification of the clearance measuring method of FIG. 1.

A first modification of FIG. 1 is shown in FIG. 2. The present modification differs from the aforementioned measuring method in a calculating process employed in the calculating step S2. The following description covers only a difference from the aforementioned method, and description of similar features is omitted.

As shown in FIG. 2, in the present modification, calculation is performed as follows. Radii r1 and r2 of the circular surfaces of the first member 11 and the second member 12, respectively, a radius e of the tip ends 14, and a clearance value d2 are relationally predetermined. When a represents a center-to-center distance between the second member 12 and the tip end 14, b represents a center-to-center distance between the first member 11 and the tip end 14, X represents a segment corresponding to a segment of length b and extending in a direction of extension of a center-to-center segment c, 2Y represents a center-to-center distance between the tip ends 14, and α represents an angle between the segment of length b and the center-to-center segment c, on the basis of the center-to-center distance 2Y between the tip ends 14, the clearance value d2 is obtained by Expression 6 given below.

[Expression 6]

When the radii r1 and r2 of the circular surfaces of the first member and the second member, respectively, the radius e of the tip ends, and the clearance value d2 are relationally predetermined, a represents a center-to-center distance between the second member and the tip end, b represents a center-to-center distance between the first member and the tip end, X represents a segment corresponding to a segment b between the center of the first member and the center of the tip end and extending in a direction of extension of a center-to-center segment c, 2Y represents a center-to-center distance between the tip ends, and α represents an angle between the center-to-center segment c and the segment b between the center of the first member and the center of the tip end, $$a = r2 + e \tag{1},$$

$$b = r1 + e \tag{2},$$

$$c = r1 + r2 + d2 \tag{3}$$

$$X = b \cdot \cos \alpha \tag{4}, \text{ and}$$

$$Y = b \cdot \sin \alpha \tag{5};$$

from the law of cosines $a^2 = b^2 + c^2 - 2bc \cdot \cos \alpha$, there is obtained $$\cos \alpha = \frac{(b^2 + c^2 - a^2)}{2bc}; \tag{6}$$

by assigning values (1) to (3) to Equation (6), there is obtained $$\cos \alpha \tag{6)'};$$

since $\sin^2 \theta + \cos^2 \theta = 1$, there is obtained $$\sin \alpha = \sqrt{(1 - \cos^2 \alpha)} \tag{7};$$

by assigning value (6)' to Equation (7), there is obtained $$\sin \alpha \tag{7)'};$$

by assigning values (2), (6)', and (7)' to Equations (4) and (5), X and Y are obtained; and when Y is obtained, the clearance value d2 is determined from a predetermined relationship between Y and d2.

For example, with r1=15 (mm), r2=9 (mm), and e=1.5 (m), a=10.5 (mm), b=16.5 (mm), and c=24+d2. Thus, for individual certain clearance values d2, measured values of the center-to-center distance 2Y between the tip ends are obtained beforehand, thereby obtaining a relational expression which represents the relationship between the clearance values d2 and the measured values 2Y. Subsequently, when a certain measured value 2Y (e.g., 11.977 (mm)) is obtained, by use of the relational expression, the clearance value d2 is calculated (e.g., d2=0.00 (mm)). That is, the relationship between the measured value 2Y and the clearance value d2 is expressed by a linear function; thus, when the measured value 2Y is obtained, the clearance value d2 is uniquely determined.

(Second Modification)

Figure 3:
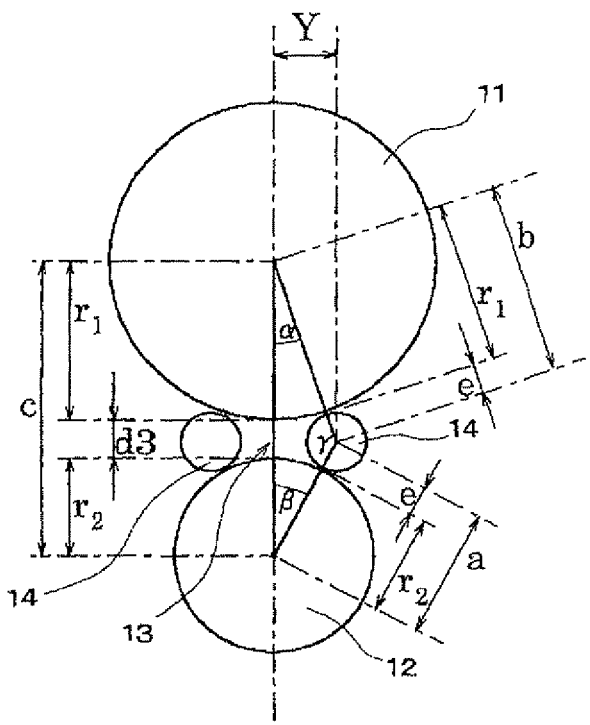
[FIG. 3] Diagram showing a second modification of the clearance measuring method of FIG. 1.

A second modification of FIG. 1 is shown in FIG. 3. The present modification is a modification of the first modification described above.

As shown in FIG. 3, in the present modification, calculation is performed as follows. Radii r1 and r2 of the circular surfaces of the first member 11 and the second member 12, respectively, a radius e of the tip ends 14, and a clearance value d3 are relationally predetermined. When a represents a center-to-center distance between the second member 12 and the tip end 14, b represents a center-to-center distance between the first member 11 and the tip end 14, 2Y represents a center-to-center distance between the tip ends 14, α represents an angle between a segment of length b and a center-to-center segment c, and β represents an angle between a segment of length a and the center-to-center segment c, on the basis of the center-to-center distance 2Y between the tip ends 14, the clearance value d3 is obtained by Expression 7 given below.

[Expression 7]

When the radii r1 and r2 of the circular surfaces of the first member and the second member, respectively, the radius e of the tip ends, and a clearance value d3 are relationally predetermined, a represents a center-to-center distance between the second member and the tip end, b represents a center-to-center distance between the first member and the tip end, 2Y represents a center-to-center distance between the tip ends, α represents an angle between a center-to-center segment c and a segment b between the center of the first member and the center of the tip end, and β represents an angle between the center-to-center segment c and a segment a between the center of the second member and the center of the tip end, $$a = r2 + e \quad (1),$$

$$b = r1 + e \quad (2),$$

$$c = r1 + r2 + d3 \quad (3),$$

$$c = b \cdot \cos\alpha + a \cdot \cos\beta, \text{ and}$$

$$Y = b \cdot \sin\alpha = a \cdot \sin\beta;$$

dividing both sides by ab gives $$\frac{Y}{ab} = \frac{\sin\alpha}{a} = \frac{\sin\beta}{b};$$

from the law of sines $$\frac{\sin\alpha}{a} = \frac{\sin\beta}{b} = \frac{\sin\gamma}{c},$$

there is obtained $$\frac{\sin\gamma}{c} = \frac{Y}{ab}; \quad (4)$$

therefore, $$Y = \frac{ab}{c}\sin\gamma;$$

from the law of cosines $c^2 = a^2 + b^2 - 2ab \cdot \cos\gamma$, there is obtained $$\cos\gamma = \frac{(a^2 + b^2 - c^2)}{2ab}; \quad (5)$$

by assigning values (1) to (3) to Equation (5), there is obtained $$\cos\gamma \quad (5)';$$

since $\sin^2\theta + \cos^2\theta = 1$, there is obtained $$\sin\gamma = \sqrt{(1 - \cos^2\gamma)} \quad (6);$$

by assigning value (5)' to Equation (6), there is obtained $$\sin\gamma \quad (6)';$$

by assigning values (1) to (3) and (6)' to Equation (4), Y is obtained; and when Y is obtained, the clearance value d3 is determined from a predetermined relationship between Y and d3.

For example, with r1=15 (mm), r2=9 (mm), and e=1.5 (mm), a=10.5 (mm), b=16.5 (mm), and c=24+d3. Thus, for individual certain clearance values d3, measured values of the center-to-center distance 2Y between the tip ends are obtained beforehand, thereby obtaining a relational expression which represents the relationship between the clearance values d3 and the measured values 2Y. Subsequently, when a certain measured value 2Y (e.g., 2Y=11.977 (mm)) is obtained, by use of the relational expression, the clearance value d3 is calculated (e.g., d3=0.00 (mm)). That is, the relationship between the measured value 2Y and the clearance value d3 is expressed by a linear function; thus, when the measured value 2Y is obtained, the clearance value d3 is uniquely determined.

The measuring methods according to the present embodiment, the first modification, and the second modification described above are characterized in that a pair of probes each having the round tip end 14 slightly larger than the very small clearance 13 between the two members 11 and 12 is brought into direct contact with the clearance 13.

First, the center-to-center distance 2Y between the two tip ends 14 is measured (measuring step S1), and, on the basis of the measured center-to-center distance 2Y, the clearance value d1 (or d2, or d3) is calculated and measured (calculating step S2). In contrast to the valve clearance measuring apparatus described in Patent Document 1 in which a clearance value is indirectly obtained from a difference, the calculated clearance value d1 is obtained through direct measurement of the clearance 13. Therefore, the clearance value d1 is highly accurate. That is, in measurement of the clearance value d1 of the clearance 13, the clearance 13 is a unique, absolutely true one. Thus, in the present embodiment, the clearance value d1 obtained through direct measurement of the clearance 13 is a highly accurate value.

In the measuring step S1, the tip ends 14 are caused to approach each other while following the profile of the circular surface of the member 11 (or 12), whereby the tip ends 14 can be reliably fitted to the clearance 13. Therefore, the accuracy of the clearance value d1 is further enhanced.

Next, a clearance measuring method according to another embodiment of the present invention will be described.

(Second Embodiment)

Figure 4:
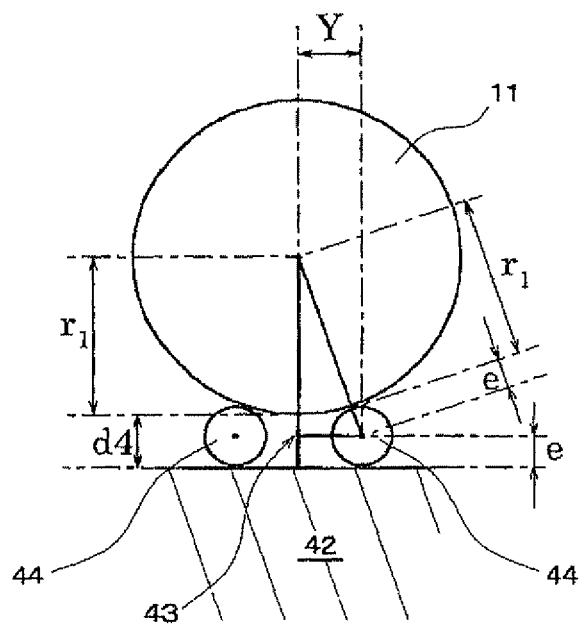
[FIG. 4] Diagram for explaining a clearance measuring method according to a second embodiment of the present invention.

FIG. 4 shows a diagram for explaining the clearance measuring method according to the present embodiment.

As shown in FIG. 4, the clearance measuring method according to the present embodiment is for measuring a clearance 43 between facing surfaces of a first member 11 having a circular surface and a second member 42 having a horizontal surface. Examples of the first member 11 include circular columnar shafts, rollers, and bearings. Examples of a surface of the second member 42 include an upper surface, a lower surface, and a side surface of a member having horizontal surfaces.

The measuring method includes a step (measuring step S41) of bringing a pair of probes each having the aforementioned tip end 14 into direct contact with the clearance 43 and measuring the center-to-center distance 2Y between the two tip ends 14, and a step (calculating step S42) of calculating and measuring a clearance value d4 on the basis of the measured center-to-center distance 2Y between the tip ends 14.

In the measuring step S41, the pair of probes having the respective tip ends 14 is caused to approach each other while following the profile of the circular surface of the member 11

(and/or the profile of the horizontal surface of the member 42), until the pair of probes come into contact with the clearance 43 between the members 11 and 42. Upon establishment of the contact, the center-to-center distance 2Y between the tip ends 14 is obtained.

Meanwhile, in the calculating step S42, on the basis of a predetermined relationship between the center-to-center distance 2Y between the tip ends 14 and the clearance value d4 to be calculated and measured, a measured value of the center-to-center distance 2Y between the tip ends 14 is converted to the clearance value d4.

Specifically, the calculating step S42 is as follows. A radii r1 of the circular surface of the first member 11, and a radius e of the tip ends 14 are predetermined. When 2Y represents a center-to-center distance between the tip ends 14, on the basis of the center-to-center distance 2Y between the tip ends 14, the clearance value d4 is obtained by Expression 8 given below. The term "predetermined" means that, since the sizes or diameters of the first and second members 11 and 42 and the tip ends 14 of the probes to be used are predetermined, the predetermined sizes or diameters are applied.

[Expression 8]

When the radius r1 of the circular surface of the first member and the radius e of the tip ends are predetermined, and 2Y represents the center-to-center distance between the tip ends, from the Pythagorean theorem, there is obtained $$r1+d4=\sqrt{(r1+e)^2-Y^2}+e;$$

therefore, $$d4=\sqrt{(r1+e)^2-Y^2}-e-r1.$$

For example, when, with r1=15 (mm) and e=1.5 (mm), a measured value of the center-to-center distance 2Y between the tip ends (e.g., 18.85 (mm)) is obtained, the clearance value d4 (e.g., 0.043 (mm)) is calculated. The relationship between the measured value 2Y and the clearance value d4 is expressed by a linear function; thus, when the measured value 2Y is obtained, the clearance value d4 is uniquely determined.

The clearance measuring method of the present embodiment is also expected to yield similar actions and effects as does the clearance measuring method of the first embodiment.

Also, according to the present embodiment, even when two members face each other such that a circular surface of one member and a horizontal surface of the other member face each other, the clearance 43 between the members is directly measured, whereby a highly accurate clearance value d4 can be obtained.

Further, according to the present embodiment, the tip ends 14 can be readily and reliably fitted to the clearance 43 merely through the following operation: the tip ends 14 are caused to approach each other while lower end surfaces of the tip ends 14 follow the profile of the horizontal surface of the second member 42.

Next, a clearance measuring unit will be described.
(Third Embodiment)

Figure 5:
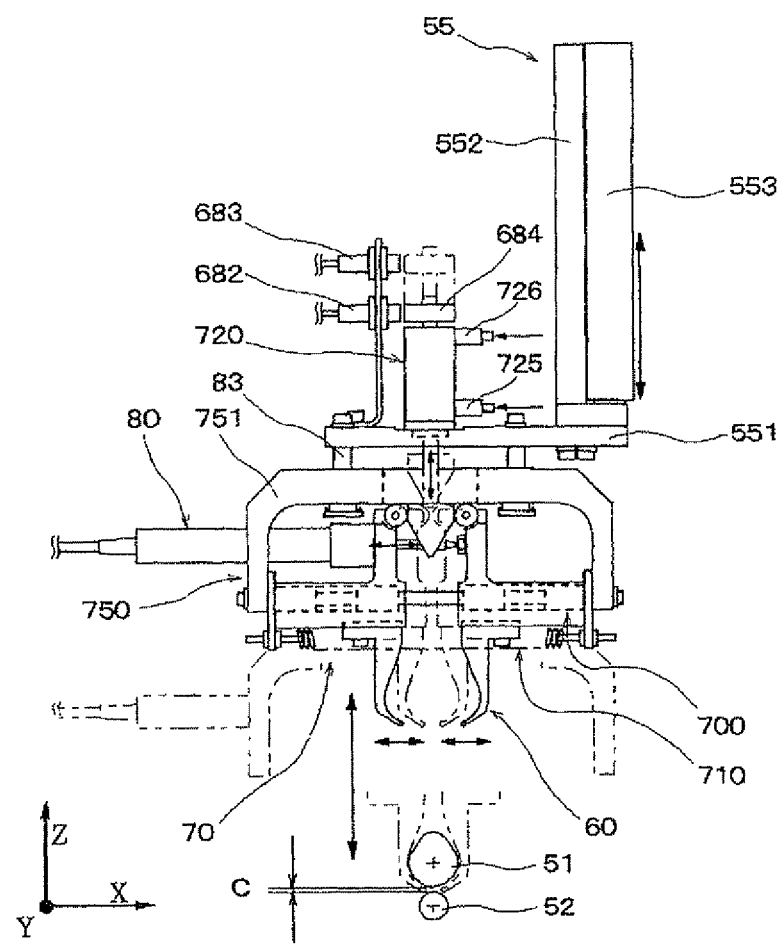
[FIG. 5] Front view of a clearance measuring unit according to a third embodiment of the present invention.
Figure 6:
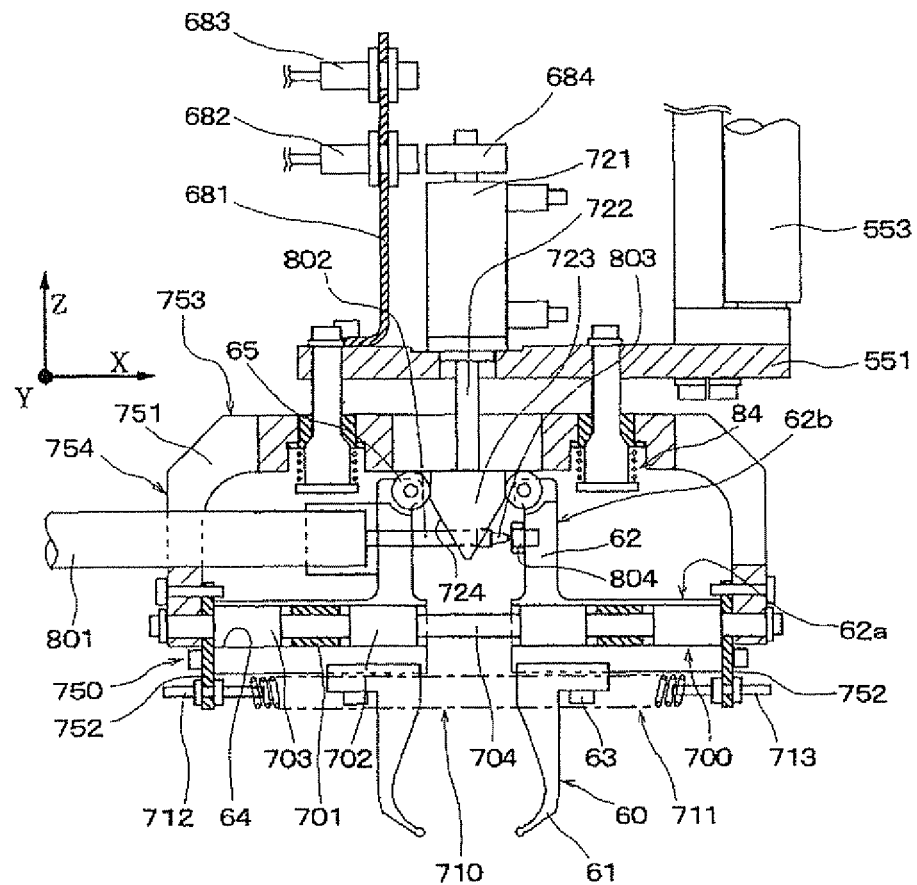
[FIG. 6] Enlarged partially cutaway view of FIG. 5.
Figure 7:
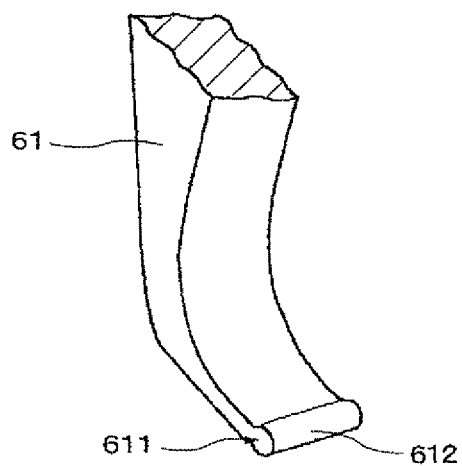
[FIG. 7] Enlarged perspective view of a tip end of a probe in FIG. 6.

FIG. 5 shows a front view of a clearance measuring unit according to a preferred embodiment of the present invention; FIG. 6 shows an enlarged partially cutaway view of FIG. 5; and FIG. 7 shows a perspective view of a tip end of a probe.

As shown in FIG. 5, the measuring unit according to the present embodiment is adapted to measure a very small clearance C between facing circular surfaces of a first member 51 having the circular surface and a second member 52 having the circular surface and includes a pair of probes 60; a holding means 750 for holding the probes 60; a moving means 55; a drive means 70; a measuring means 80; and a calculating means (not shown).

(Probes)

As shown in FIG. 6, each of the probes 60 is configured as follows: a claw member 61 is fixed to a probe block 62 having an L-shaped cross section by use of a bolt 63 to thereby be provided in a suspended condition. The probe block 62 has a horizontal base portion 62a, and a vertical portion 62b. A pair of the probes 60 is configured as follows: the vertical portions 62b of the probe blocks 62 are disposed such that their backs face each other, and tip end portions of the claw members 61 are curved toward the center (toward each other).

The base portions 62a of the probe blocks 62 have respective through holes 64 extending in the direction of the X-axis in FIG. 6. The through holes 64 of a pair of the probes 60 are aligned with each other. Two rollers 65 rollable on the X-Z plane in FIG. 6 are provided at respective upper positions on the vertical portions 62b of the probe blocks 62. The two rollers 65 are in contact with a taper surface 724 of a rectilinear cam 723, which will be described later.

As shown in FIG. 7, each of the claw members 61 has a round tip end 611 slightly larger than the clearance C shown in FIG. 5. Each of the tip ends 611 assumes the form of a column having a substantially circular section. Peripheral surfaces 612 of the substantially circular columns are fitted to and brought into direct contact with the clearance C.

(Holding Means)

The holding means 750 include an arch bracket 751 which holds a pair of the probes 60 via a shaft 704, which will be described later, and two plates 752 suspended from the bracket 751. Each of the plates 752 is disposed between the corresponding vertical portion 754 of the bracket 751 and the corresponding probe block 62. Each of the plates 752 and the bracket 751 are tightened together by a tightening means, such as a bolt.

Figure 8:
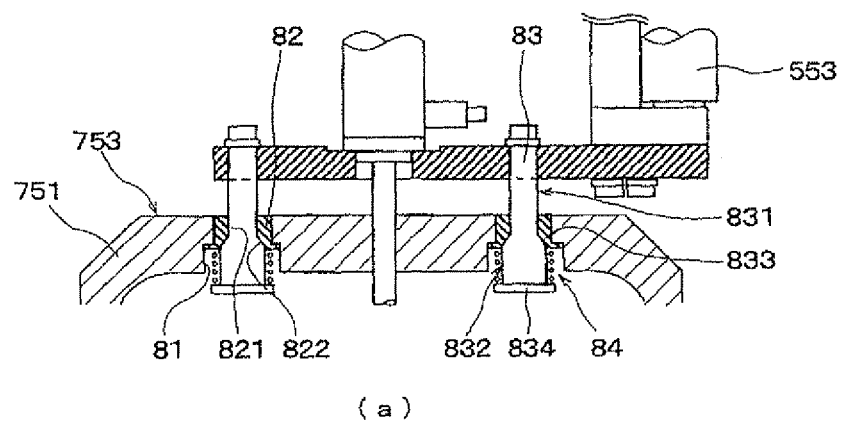
Figure 8:
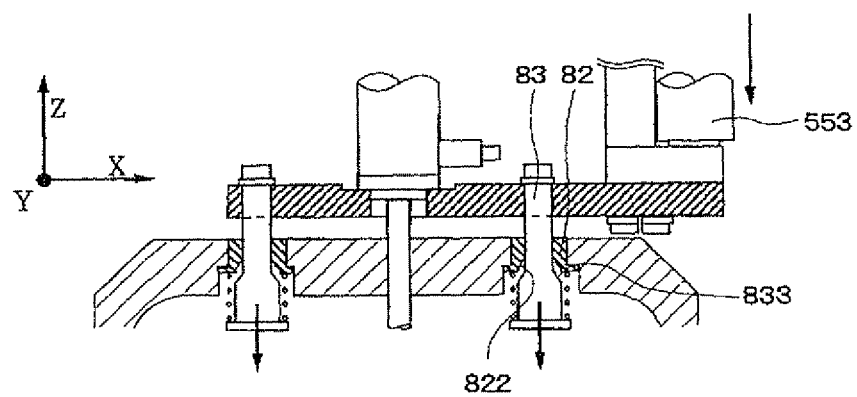

As shown in FIG. 8(a), an upper horizontal portion 753 of the bracket 751 has two through holes 81 extending therethrough in the vertical direction. Each of the through holes 81 has a stepped portion at which diameter is expanded downward, and a bushing 82 is seated on the stepped portion from underneath. A lower edge of an opening 821 of each of the bushings 82 is formed into a taper surface 822 whose diameter increases downward.

Each of pins 83 has an upper small-diameter portion 831 and a lower large-diameter portion 832. A taper portion 833 is formed at the boundary between the small-diameter portion 831 and the large-diameter portion 832. Further, the large-diameter portion 832 has a flange portion 834 formed at the bottom thereof. A compression spring 84, which will be described later, is fitted to the large-diameter portion 832, and the lower end of the compression spring 84 rests on the flange portion 834.

The circular columnar pins 83 are inserted through the openings 821 of the bushings 82 via the compression springs 84. Upper portions of the small-diameter portions 831 projecting from the openings 821 are fixed to a horizontal bracket 551. At this time, because of their own weights of a pair of the probes 60, the holding means 750, the drive means 70, and the measuring means 80, the taper surfaces 822 are seated on the respective taper portions 833 in a condition that the bushings 82 compress the respective compression springs 84.

(Moving Means)

As shown in FIG. 5, the moving means 55 includes the horizontal bracket 551, a vertical bracket 552 standing on the horizontal bracket 551, and an elevating mechanism 553 whose piston is fixed, at one end, to the vertical bracket 552 and which is fixed to an unillustrated fixed structure. The horizontal bracket 551 is connected to the bracket 751 via the aforementioned pins 83. The elevating mechanism 553 is provided in such a manner as to be retractable in the direction of the Z-axis in FIG. 5. When the piston of the elevating mechanism (air cylinder) 553 extends, the entire measuring unit excluding the elevating mechanism 553 moves downward. When the piston of the elevating mechanism 553 retracts, the entire measuring unit excluding the elevating mechanism 553 moves upward.

By virtue of the moving means 55, a pair of the probes 60 can be moved to a clearance position (or the two members 51 and 52 can be moved to a position between a pair of the probes 60).

In addition to an air cylinder, an oil hydraulic cylinder, a servomotor, a screw feed mechanism which uses a ball screw, an electromagnetic actuator which uses solenoid, etc. can be applied to the elevating mechanism 553.

(Drive Means)

The drive means 70 includes a linear motion guide 700, a tension spring 710, and a slide mechanism 720.

As shown in FIG. 6, the linear motion guide 700 is held by the bracket 751 and supports a pair of the probes 60 in such a manner as to allow opening and closing of a pair of the probes 60. Specifically, in the through hole 64 of each of the aforementioned probe blocks 62, LM stroke members 702 and 703 are disposed with a collar 701 therebetween. The shaft 704, which serves as a linear motion guide, is inserted through the two through holes 64 and fitted through the collars 701 and the LM stroke members 702 and 703. Opposite ends of the shaft 704 are fixed to the bracket 751. The LM stroke members 702 and 703 allow a pair of the probes 60 to slide along the shaft 704 in the direction of the X-axis. The LM stroke member is a limited-stroke-type rectilinear guide mechanism which can guide a rotary motion and a reciprocating motion in a rolling manner.

The tension spring 710 includes a spring body 711 disposed in parallel with the shaft 704 of the linear motion guide 700, and hook members 712 and 713 disposed at respective opposite end portions of the spring body 711. The hook members 712 and 713 are fixed to and held by the two respective plates 752 suspended from the bracket 751. The tension spring 710 is disposed in such a condition as to urge the probe blocks 62 inward via the plates 752. A pair of the probes 60 is closed by the tension spring 710.

The slide mechanism 720 includes an actuator 721 held by the horizontal bracket 551 of the moving means 55 and adapted to provide vertically rectilinear driving, and a rectilinear cam 723 connected to the actuator 721 and having a taper surface 724 formed at a tip end thereof. The actuator 721 lowers the rectilinear cam 723, whereby the aforementioned rollers 65 roll on the taper surface 724. As a result, a pair of the probes 60 is opened. An example of the actuator 721 is an air cylinder. Two air supply ports 725 and 726 are connected to the air cylinder 721. When air is supplied from the air supply port 726, a piston 722 extends. When air is supplied from the other air supply port 725, the piston 722 retracts. In addition to the air cylinder 721, an oil hydraulic cylinder, a servomotor, a screw feed mechanism which uses a ball screw, an electromagnetic actuator which uses solenoid, etc. can be applied to the actuator 721.

(Measuring Means)

As shown in FIG. 6, the measuring means 80 for measuring the center-to-center distance between tip ends 611 of a pair of the probes 60 is attached to one of the vertical portions 754 of the bracket 751. The measuring means 80 includes a stem 801, which is a body portion, and a spindle 802, which is accommodated in the stem 801 slidably along the axial direction and has a probe 803 at a tip thereof. The spindle 802 is urged at all times in the direction of projection from the stem 801 (in the direction of the X-axis in FIG. 6). An example of the measuring means 80 is a digital gauge.

The stem 801 is fixed to the vertical portion 754 (bracket 751) and the probe block 62 which are located on one side (left side in FIG. 6). A stop pin 804 is provided on an inward facing side (left-hand side) of the vertical portion 62b of the probe block 62 located on the other side (right side in FIG. 6). The probe 803 of the extended spindle 802 is brought into contact with the stop pin 804, thereby measuring the center-to-center distance between the tip ends 611 of a pair of the probes 60.

(Calculating Means)

The aforementioned measuring means 80 is electrically connected to an unillustrated calculating means. On the basis of a center-to-center distance between the tip ends 611 measured by the measuring means 80, a clearance value is calculated and measured by the calculating means. The calculating means may be an independent unit or incorporated in the moving means 55 or the slide mechanism 720.

(Proximity Sensor)

As shown in FIG. 6, a vertical bracket 681 stands on the horizontal bracket 551. A first proximity sensor 682 is provided at a predetermined lower position on the vertical bracket 681. A second proximity sensor 683 is provided at a predetermined upper position on the vertical bracket 681. A dog 684 is provided at an upper portion of the actuator (air cylinder) 721 of the slide mechanism 720. The attachment positions of the first and second proximity sensors 682 and 683 in relation to the bracket 681 are adjusted such that the first proximity sensor 682 detects the most opened position of a pair of the probes 60, whereas the second proximity sensor 683 detects the most closed position of a pair of the probes 60.

In the present embodiment, in order to allow the entire measuring unit to be rotatable about the Z-axis, a rotary mechanism may be connected to the upper end of the moving means 55. As for the claw member 61 of the probe 60, a plurality of types different in shape and size (diameter) of the tip end 611 may be prepared beforehand for replacing the claw members as appropriate according to the clearance C between the members 51 and 52 shown in FIG. 5.

Next, the actions of the present embodiment will be described with reference to FIGS. 5 to 9.

Figure 9:
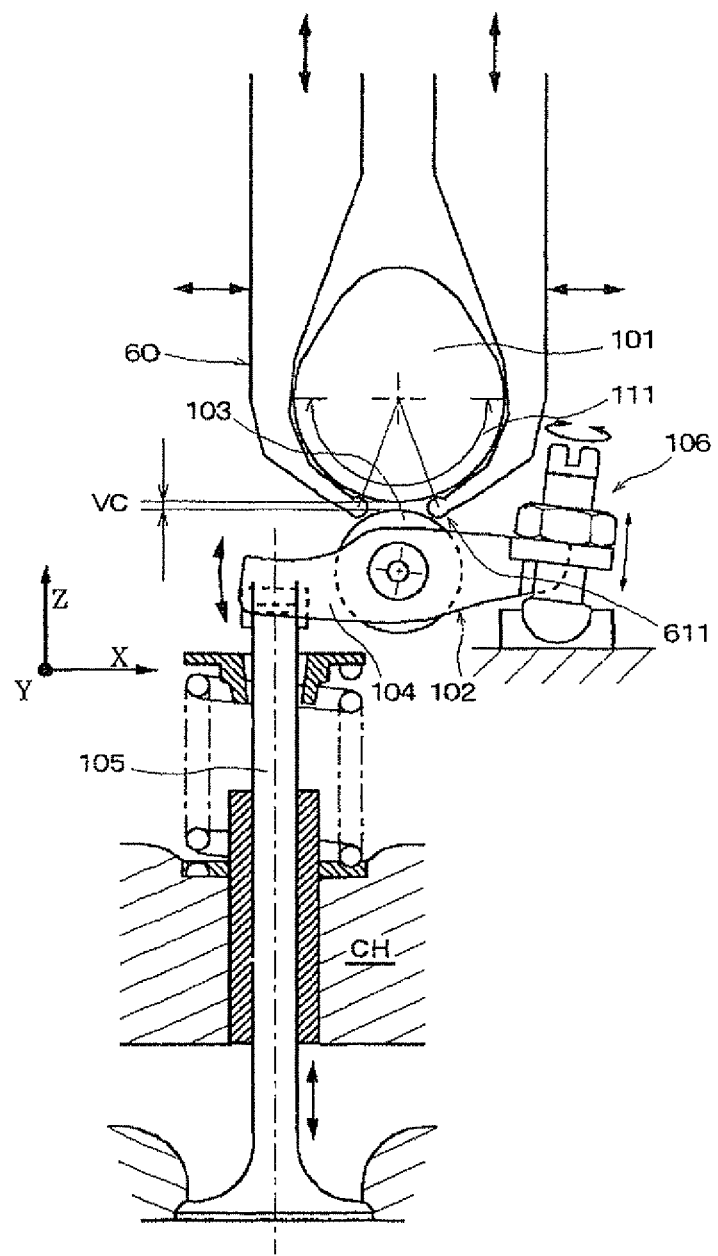
[FIG. 9] Partially sectional front view showing an example in which the clearance measuring unit of FIG. 5 is applied to measurement of a valve clearance for a rocker arm type.

FIG. 9 shows an example in which the measuring unit according to the third embodiment is applied to measurement of a valve clearance for a rocker arm type. By use of the aforementioned measuring unit shown in FIG. 5, the clearance value of a valve clearance VC shown in FIG. 9 is obtained.

As shown in FIG. 9, the valve clearance VC (clearance) is a clearance between a cam shaft 101 (first member) and a roller 103 (second member) of a rocker arm 102. The tip ends 611 of a pair of the probes 60 are fitted to and brought into contact with the valve clearance VC. The cam shaft 101 and the rocker arm 102 are assembled to and fixedly disposed on a cylinder head CH.

Meanwhile, one end of an arm body 104 of the rocker arm 102 is in contact with a valve 105, and the other end is in contact with an adjust screw 106. By means of turning the adjust screw 106, the clearance value of the valve clearance VC can be adjusted. The one end (left end in FIG. 9) of the arm body 104 in contact with the valve 104 can move vertically while the other end (right end in FIG. 9) in contact with the adjust screw 106 serves as a fulcrum.

First, the tip ends 611 of a pair of the probes 60 are brought into contact with each other, and the probe 803 of the measuring means (digital gauge) 80 is brought into contact with the stop pin 804. The center-to-center distance between the tip ends 611 at this time is two times the radius (e (predetermined value) shown in FIG. 1) of the tip end 611; i.e., the diameter (2e) of the tip end 611. The value of 2e is set as the reading of the digital gauge.

By use of a master jig (not shown) in which the valve clearance VC between the cam shaft 101 and the roller 103 is set to 0 (zero), the tip ends 611 of a pair of the probes 60 are brought into contact with the valve clearance VC. In this condition, the clearance value is set to zero.

After completion of the above initialization, the aforementioned cylinder head is conveyed to a measuring zone by an unillustrated conveying means. Subsequently, the predetermined cam shaft 101 and rocker arm 102 to be subjected to measurement of the valve clearance VC are positioned so as to be located immediately under the measuring unit. The number of the rocker arms 102 on the cylinder head is determined as appropriate according to the number of valves of an engine. A plurality of the measuring units may be provided along the direction of conveyance. For example, the number of the measuring units is rendered equal to the number of valves.

Subsequently, as shown in FIG. 5, the elevating mechanism 553 of the moving means 55 is driven to move downward the entire measuring unit excluding the elevating mechanism 553.

During the course of this downward movement, when the level of the tip ends 611 of a pair of the probes 60 in the vertical direction (in the direction of the Z-axis in FIG. 5) reaches, for example, the position of a base circle (the range denoted by reference numeral 111 in FIG. 9), which is a circular portion of the cam shaft 101, an operation of closing a pair of the probes 60 starts. Specifically, the air cylinder 721 of the slide mechanism 720 of the drive means 70 is driven to move the piston 722 upward. As a result, the rollers 65 of a pair of the probes 60 roll along the taper surface 724 of the rectilinear cam 723, and an urging force of the tension spring 710 directed in a closing direction initiates the closing of a pair of the probes 60. The timing of the start of driving of the air cylinder 721 is preset such that, when the stroke of the elevating mechanism 553 reaches a certain fixed value, the air cylinder 721 is interlockingly driven.

Even during the course of closing of a pair of the probes 60, the elevating mechanism 553 continues moving the measuring unit downward. At this time, an urging force of the tension spring 710 directed in a closing direction causes a pair of the probes 60 to be gradually closed in such a manner as to follow the profile of the base circle. Therefore, the tip ends 611 follow the profile of the base circle at all times. That is, a pair of the probes 60 is moved downward while being closed in such a manner as to follow the profile of the base circle of the cam shaft 101.

In the course of closing of a pair of the probes 60, when the tip ends 611 are fitted to and brought into contact with the, valve clearance VC, the downward movement of the entire measuring unit is stopped, since the cylinder head CH is a fixed structure. However, in this condition, due to its own weight of the measuring unit (particularly, the holding means 750, the drive means 70, and the measuring means 80), it is uncertain whether or not the tip ends 611 are reliably located at the position of the valve clearance VC. Thus, the measuring unit according to the present embodiment has a floating mechanism effected by the pins 83 inserted through the bracket 751.

When the tip ends 611 are brought to the position of the valve clearance VC and brought into contact with the valve clearance VC, the piston 722 of the air cylinder 721 is raised to the highest level. In association with this rise, the dog 684 attached to the piston 722 is detected by the second proximity sensor 683. Upon this detection, the elevating mechanism 553 is slightly moved downward.

At this time, since the tip ends 611 are located and fixed at the position of the valve clearance VC, the bracket 751, which is united with a pair of the probes 60, is not moved downward. Meanwhile, since the bracket 751 is merely seated on the pins 83, which are connected to the elevating mechanism 553 via the horizontal bracket 551, and is not fixed to the pins 83, the pins 83 are moved downward while following the movement of the elevating mechanism 553. As a result, as shown in FIG. 8(b), the taper portions 833 of the pins 83 and the taper surfaces 822 of the bushings 82 are separated from each other.

In association with this separation, urging forces of the compression springs 84 directed upward in the vertical direction push up the bracket 751 in the vertical direction (the direction of the Z-axis in FIG. 8(b)), thereby canceling their own weights of the holding means 750, the drive means 70, and the measuring means 80. By virtue of this cancellation of their own weights; i.e., a floating action, the tip ends 611 search for the position of the valve clearance VC (or move around toward the position of the valve clearance VC) and reliably reach the position of the valve clearance VC.

In a condition in which the tip ends 611 are fitted to the valve clearance VC, the reading of the measuring means 80 whose probe 803 is in contact with the stop pin 804 is a measured value of the center-to-center distance between the tip ends 611 (measuring step S1). An actual clearance value is calculated and measured according to formulas (refer to Expressions 5, 6, and 7) stored in a PLC of the calculating means (calculating step S2).

After calculation of the clearance value, the measuring unit is driven according to a procedure reverse to that described above, for separating a pair of the probes 60 from the valve clearance VC between the cam shaft 101 and the roller 103. When there remain valves whose valve clearances VC are not measured, the remaining valves are sequentially measured for the valve, clearance VC. Upon completion of measurement of the valve clearance VC, the conveying means conveys the cylinder head to the next step. In the case where the valve clearance VC falls outside a designed tolerance, the cylinder head is returned to the preceding valve clearance adjustment step for adjusting the valve clearance VC again.

Meanwhile, in the cylinder head CH, the base circle profile of the cam shaft 101, the lever ratio of the rocker arm 102, and the center positions of the cam shaft 101 and the roller 103 of the rocker arm 102 differ in error among valves, so that assembling accuracy varies among the valves. Therefore, it is not easy to reliably bring the tip ends 611 of a pair of the probes 60 to the position of the valve clearance VC. Also, if an attempt to close a pair of the probes 60 is performed after the pair of probes 60 is lowered completely, the pair of probes 60 cannot be closed due to interference with the adjust screw 106. As a result, the tip ends 611 fail to be brought into direct contact with the valve clearance VC.

According to the measuring unit of the present embodiment, a pair of the probes 60 is lowered while the tip ends 611 of the pair of probes 60 are closed in such a manner as to follow the profile of the base circle of the cam shaft 101. Thus, irrespective of assembling accuracy, the tip ends 611 can be brought into direct contact with the valve clearance VC and can be reliably brought to the position of the valve clearance VC. As a result, an accurate clearance value can be obtained.

Also, each of the tip ends 611 assumes the form of a column having a substantially circular section, and the peripheral surfaces 612 of the tip ends 611 are brought into contact with the valve clearance VC. Thus, contact between the tip ends 611 and each of the members 101 and 103 at the clearance position is line contact in the direction of the Y-axis in FIG. 9, rather than point contact. Therefore, the tip ends 611 can be stably in contact with the position of the valve clearance VC.

The present embodiment has been described while mentioning measurement of the valve clearance VC between the cam shaft 101 and the roller of the rocker arm 102. However, the present invention is not limited thereto. For example, the present invention can be applied to all cases of direct measurement of such a very small clearance between two facing members that cannot be measured by conventional measuring apparatus.

The present embodiment has been described while mentioning the moving means in which the elevating mechanism 553 is connected to the horizontal bracket 551 for moving the measuring unit downward. However, the present invention is not limited thereto. For example, the following configuration may be employed: under the conveying means is provided moving means for unloading a cylinder head from the conveying means and moving the cylinder head upward, and the moving means moves the cylinder head upward. In this case, there is no need to move the measuring unit vertically, and only an operation of opening and closing a pair of the probes 60 suffices.

Next, another embodiment of the clearance measuring unit will be described.

(Fourth Embodiment)

Figure 10:
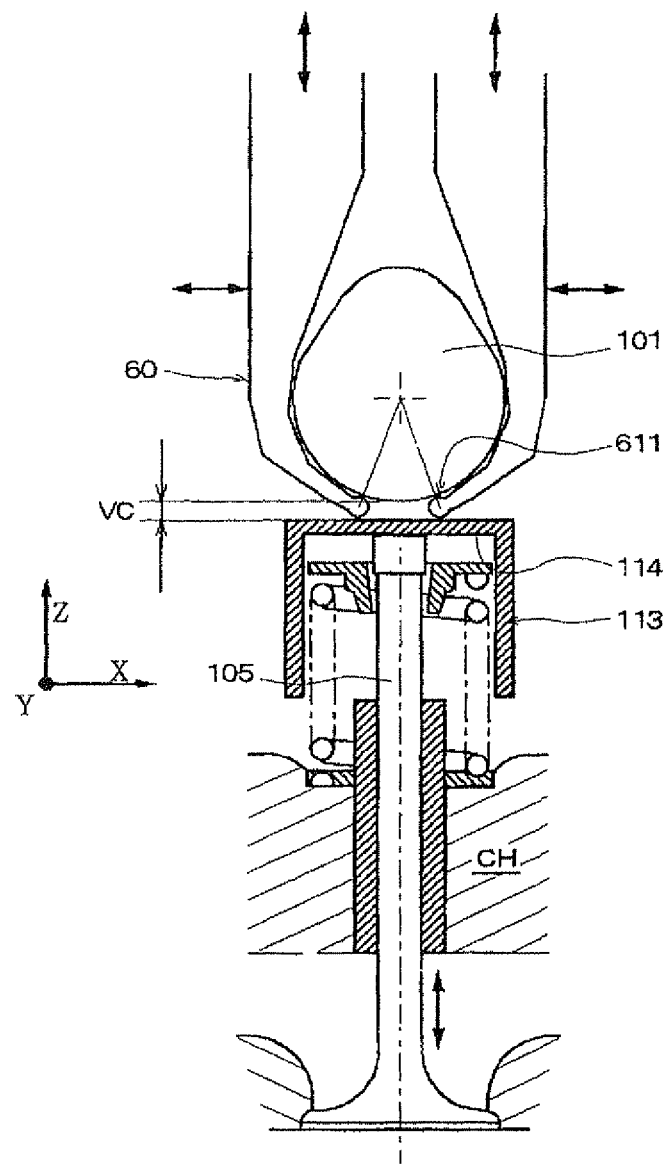
[FIG. 10] Partially sectional front view showing an example in which the clearance measuring unit of FIG. 5 is applied to measurement of a valve clearance for a direct acting type.

FIG. 10 shows an example in which the clearance measuring unit according to the third embodiment is applied to measurement of a valve clearance for a direct acting type.

As shown in FIG. 10, the valve clearance VC is a clearance between the cam shaft 101 (first member) and a closed-topped cylindrical valve lifter 113 (second member). The lower surface of a closed-top portion 114 of the valve lifter 113 is in contact with the valve 105. The tip ends 611 of a pair of the probes 60 are fitted to and brought into contact with the valve clearance VC. The cam shaft 101 and the valve lifter 113 are assembled to and fixedly disposed on the cylinder head CH.

The clearance measuring unit of the present embodiment is also expected to yield similar actions and effects as does the clearance measuring unit of the third embodiment.

According to the present embodiment, a surface of the valve lifter 113 which faces the cam shaft 101 is a horizontal surface; thus, irrespective of the positional relationship between the cam shaft 101 and the valve lifter 113, the valve clearance VC is uniquely determined. Thus, the tip ends 611 can be readily and reliably fitted to the valve clearance VC merely through the following operation: the tip ends 611 are caused to approach each other while lower end surfaces of the tip ends 611 follow the profile of the horizontal surface of the valve lifter 113.

Needless to say, the present invention is not limited to the above embodiments, but may be embodied in various other modes.

The invention claimed is:

1. A clearance measuring method for measuring clearance between facing circular surfaces of a first member and a second member each having the circular surface, comprising:
a step of bringing a pair of probes each having a round tip end slightly larger than the clearance into direct contact with the facing surfaces and measuring a center-to-center distance 2Y between the two tip ends, and
a calculating step of calculating and measuring a clearance value d1 on the basis of the center-to-center distance 2Y between the tip ends,
wherein, in the calculating step, on the basis of a predetermined relationship between the center-to-center distance 2Y between the tip ends and the clearance value to be calculated and measured, a measured value of the center-to-center distance between the tip ends is converted to the clearance value d1 as follows:
when:
radii r1 and r2 of the circular surfaces of the first member and the second member, respectively, and a radius e of the tip ends are predetermined;
a represents a center-to-center distance between the second member and the tip end,
b represents a center-to-center distance between the first member and the tip end,
s represents a segment corresponding to a segment b between the center of the first member and the center of the tip end and extending in a direction of extension of a center-to-center segment c between the first member and the second member, and
t represents a segment corresponding to a segment a between the center of the second member and the center of the tip end and extending in the direction of extension of the center-to-center segment c,
then:

$$a=r2+e \text{ and}$$

$$b=r1+e;$$

from the Pythagorean theorem, there are obtained $$s^2=b^2-Y^2 \text{ and}$$

$$t^2=a^2-Y^2;$$

since c=s+t, there is obtained:

$$c=\sqrt{(b^2-Y^2)}+\sqrt{(a^2-Y^2)}; \text{ and}$$

since the clearance value d1 is represented by d1=c−(r1+r2), there is obtained:

$$d1=\sqrt{(b^2-Y^2)}+\sqrt{(a^2-Y^2)}-(r1+r2).$$

2. A clearance measuring method for measuring clearance between facing circular surfaces of a first member and a second member each having the circular surface, comprising:
a step of bringing a pair of probes each having a round tip end slightly larger than the clearance into direct contact with the facing surfaces and measuring a center-to-center distance 2Y between the two tip ends, and
a calculating step of calculating and measuring a clearance value d2 on the basis of the center-to-center distance 2Y between the tip ends,
wherein, in the calculating step, on the basis of a predetermined relationship between the center-to-center distance 2Y between the tip ends and the clearance value d2 to be calculated and measured, a measured value of the center-to-center distance 2Y between the tip ends is converted to the clearance value d2 as follows:
when:
radii r1 and r2 of the circular surfaces of the first member and the second member, respectively, and a radius a of the tip ends are predetermined;
a represents a center-to-center distance between the second member and the tip end,
b represents a center-to-center distance between the first member and the tip end, X represents a segment corresponding to a segment b between the center of the first member and the center of the tip end and extending in a direction of extension of a center-to-center segment c, and α represents an angle between the center-to-center segment c and the segment b between the center of the first member and the center of the tip end, then:

$$a = r2 + e \quad (1),$$

$$b = r1 + e \quad (2),$$

$$c = r1 + r2 + d2 \quad (3),$$

$$X = b \cdot \cos \alpha \quad (4), \text{ and}$$

$$Y = b \cdot \sin \alpha \quad (5);$$

from the law of cosines $a^2 = b^2 + c^2 - 2bc \cdot \cos \alpha$, there is obtained:

$$\cos \alpha = \frac{(b^2 + c^2 - a^2)}{2bc}; \quad (6)$$

by assigning values (1) to (3) to Equation (6), there is obtained:

$$\cos \alpha \quad (6)';$$

since $\sin^2 \theta + \cos^2 \theta = 1$, there is obtained:

$$\sin \alpha = \sqrt{(1 - \cos^2 \alpha)} \quad (7);$$

by assigning value (6)' to Equation (7), there is obtained $$\sin \alpha \quad (7)';$$

by assigning values (2), (6)', and (7)' to Equations (4) and (5), X and Y are obtained; and when Y is obtained, the clearance value d2 is determined from a predetermined relationship between Y and d2.

3. A clearance measuring method for measuring clearance between facing circular surfaces of a first member and a second member each having the circular surface, comprising:

a step of bringing a pair of probes each having a round tip end slightly larger than the clearance into direct contact with the facing surfaces and measuring a center-to-center distance 2Y between the two tip ends, and a calculating step of calculating and measuring a clearance value d3 on the basis of the center-to-center distance 2Y between the tip ends, wherein, in the calculating step, on the basis of a predetermined relationship between the center-to-center distance 2Y between the tip ends and the clearance value d3 to be calculated and measured, a measured value of the center-to-center distance 2Y between the tip ends is converted to the clearance value d3 as follows:

when:

radii r1 and r2 of the circular surfaces of the first member and the second member, respectively, and a radius e of the tip ends are predetermined;

a represents a center-to-center distance between the second member and the tip end;

b represents a center-to-center distance between the first member and the tip end;

α represents an angle between a center-to-center segment c and a segment b between the center of the first member and the center of the tip end, and β represents an angle between the center-to-center segment c and a segment a between the center of the second member and the center of the tip end, then:

$$a = r2 + e \quad (1),$$

$$b = r1 + e \quad (2),$$

$$c = r1 + r2 + d3 \quad (3),$$

$$c = b \cdot \cos \alpha + a \cdot \cos \beta, \text{ and}$$

$$Y = b \cdot \sin \alpha = a \cdot \sin \beta;$$

dividing both sides by ab gives:

$$\frac{Y}{ab} = \frac{\sin \alpha}{a} = \frac{\sin \beta}{b};$$

from the law of sines, $$\frac{\sin \alpha}{a} = \frac{\sin \beta}{b} = \frac{\sin \gamma}{c},$$

there is obtained:

$$\frac{\sin \gamma}{c} = \frac{Y}{ab}; \quad (4)$$

therefore, $$Y = \frac{ab}{c} \sin \gamma;$$

from the law of cosines $c^2 = a^2 + b^2 - 2ab \cdot \cos \gamma$, there is obtained:

$$\cos \gamma = \frac{(a^2 + b^2 - c^2)}{2ab}; \quad (5)$$

by assigning values (1) to (3) to Equation (5), there is obtained:

$$\cos \gamma \quad (5)';$$

since $\sin^2 \theta + \cos^2 \theta = 1$, there is obtained $$\sin \gamma = \sqrt{(1 - \cos^2 \gamma)} \quad (6);$$

by assigning value (5)' to Equation (6), there is obtained $$\sin \gamma \quad (6)';$$

by assigning values (1) to (3) and (6)' to Equation (4), Y is obtained; and when Y is obtained, the clearance value d3 is determined from a predetermined relationship between Y and d3.

4. A clearance measuring method for measuring clearance between facing surfaces of a first member having a circular surface and a second member having a horizontal surface, comprising:

a step of bringing a pair of probes each having a round tip end slightly larger than the clearance into direct contact with the facing surfaces and measuring a center-to-center distance 2Y between the two tip ends, and a calculating step of calculating and measuring a clearance value d4 on the basis of the center-to-center distance 2Y between the tip ends, wherein, in the calculating step, on the basis of a predetermined relationship between the center-to-center distance 2Y between the tip ends and the clearance value d4 to be calculated and measured, a measured value of the center-to-center distance 2Y between the tip ends is converted to the clearance value d4 as follows:

when a radius r1 of the circular surface of the first member and a radius e of the tip ends are predetermined, from the Pythagorean theorem, there is obtained:

$$r1+d4=\sqrt{(r1+e)^2+Y^2}-e-r1;$$

therefore, $$d4=\sqrt{(r1+e)^2-Y^2}+e-r1.$$

5. A clearance measuring unit for measuring clearance between facing circular surfaces of a first member and a second member each having the circular surface, comprising:
   a pair of probes adapted to be brought into direct contact with the facing surfaces and having respective round tip ends slightly larger than the clearance;
   an arch bracket holding the pair of probes;
   moving means for moving the pair of probes to a position of the clearance or moving the first and second members to a position between the pair of probes;
   drive means connected to the pair of probes and adapted to open and close the probes;
   measuring means for measuring a center-to-center distance between the tip ends of the pair of probes; and
   calculating means for calculating a clearance value on the basis of a measured center-to-center distance between the tip ends,
   wherein the moving means can move vertically and is connected to the bracket, and
   wherein the drive means comprises:
      a linear motion guide held by the bracket and supporting the pair of probes in such a manner as to allow opening and closing of the pair of probes;
      a tension spring held by the bracket, provided in parallel with the linear motion guide, and adapted to close the pair of probes; and
      a slide mechanism held by the moving means and adapted to open the pair of probes.

6. A clearance measuring unit according to claim 5, wherein the slide mechanism comprises an actuator provided unitarily with the moving means and adapted to provide vertically rectilinear driving and
   a rectilinear cam connected to the actuator and having a taper surface formed at a tip end thereof; and
   rollers are provided at facing inner side surfaces, respectively, of the pair of probes in such a manner as to be rollable along the taper surface of the rectilinear cam.

7. A clearance measuring unit according to claim 5, wherein each of the tip ends assumes the form of a column having a substantially circular section, and peripheral surfaces of the substantially circular columns are brought into direct contact with the facing surfaces.

8. A clearance measuring unit for measuring clearance between facing circular surfaces of a first member and a second member each having the circular surface, comprising:
   a pair of probes adapted to be brought into direct contact with the facing surfaces and having respective round tip ends slightly larger than the clearance;
   an arch bracket holding the pair of probes;
   moving means for moving the pair of probes to a position of the clearance or moving the first and second members to a position between the pair of probes;
   drive means connected to the pair of probes and adapted to open and close the probes;
   measuring means for measuring a center-to-center distance between the tip ends of the pair of probes; and
   calculating means for calculating a clearance value on the basis of a measured center-to-center distance between the tip ends,
   wherein the moving means can move vertically and is connected to the bracket,
   wherein the bracket has through holes extending therethrough in a vertical direction,
   wherein pins are inserted through the respective through holes via respective compression springs urging the bracket upward in the vertical direction,
   wherein the moving means can move in the vertical direction and is connected to projecting portions of the pins; and
   wherein the bracket is floatably supported by the pins.

9. A clearance measuring unit according to claim 8, wherein each of the tip ends assumes the form of a column having a substantially circular section, and peripheral surfaces of the substantially circular columns are brought into direct contact with the facing surfaces.

10. A clearance measuring unit for measuring clearance between facing surfaces of a first member having a circular surface and a second member having a horizontal surface, comprising:
    a pair of probes adapted to be brought into direct contact with the facing surfaces and having respective round tip ends slightly larger than the clearance;
    an arch bracket holding the pair of probes;
    moving means for moving the pair of probes to a position of the clearance or moving the first and second members to a position between the pair of probes;
    drive means connected to the pair of probes and adapted to open and close the probes;
    measuring means for measuring a center-to-center distance between the tip ends of the pair of probes; and
    calculating means for calculating a clearance value on the basis of a measured center-to-center distance between the tip ends, and
    wherein the moving means can move vertically and is connected to the bracket, and
    wherein the drive means comprises:
    a linear motion guide held by the bracket and supporting the pair of probes in such a manner as to allow opening and closing of the pair of probes;
    a tension spring held by the bracket, provided in parallel with the linear motion guide, and adapted to close the pair of probes; and
    a slide mechanism held by the moving means and adapted to open the pair of probes.

11. A clearance measuring unit according to claim 10, wherein each of the tip the tip ends assumes the form of a column having a substantially circular section, and peripheral surfaces of the substantially circular columns are brought into direct contact with the facing surfaces.

12. A clearance measuring unit according to claim 10, wherein the slide mechanism comprises an actuator provided unitarily with the moving means and adapted to provide vertically rectilinear driving and
    a rectilinear cam connected to the actuator and having a taper surface formed at a tip end thereof; and rollers are provided at facing inner side surfaces, respectively, of the pair of probes in such a manner as to be rollable along the taper surface of the rectilinear cam.

13. A clearance measuring unit for measuring clearance between facing surfaces of a first member having a circular surface and a second member having a horizontal surface, comprising:
   a pair of probes adapted to be brought into direct contact with the facing surfaces and having respective round tip ends slightly larger than the clearance;
   an arch bracket holding the pair of probes;
   moving means for moving the pair of probes to a position of the clearance or moving the first and second members to a position between the pair of probes;
   drive means connected to the pair of probes and adapted to open and close the probes;
   measuring means for measuring a center-to-center distance between the tip ends of the pair of probes; and
   calculating means for calculating a clearance value on the basis of a measured center-to-center distance between the tip ends, and
   wherein the bracket has through holes extending therethrough in a vertical direction;
   wherein pins are inserted through the respective through holes via respective compression springs urging the bracket upward in the vertical direction;
   wherein the moving means can move in the vertical direction and is connected to projecting portions of the pins; and
   wherein the bracket is floatably supported by the pins.

14. A clearance measuring unit according to claim 13, wherein each of the tip ends assumes the form of a column having a substantially circular section, and peripheral surfaces of the substantially circular columns are brought into direct contact with the facing surfaces.

* * * * *

UNITED STATES PATENT AND TRADEMARK OFFICE
CERTIFICATE OF CORRECTION

PATENT NO. : 8,467,989 B2
APPLICATION NO. : 12/935143
DATED : June 18, 2013
INVENTOR(S) : Hisayuki Sueoka et al.

It is certified that error appears in the above-identified patent and that said Letters Patent is hereby corrected as shown below:

In the Claims:

Column 18, Line 62 (claim 2): Please replace "a radius a" with --a radius e--.

Column 19, Line 5 (claim 2): Please replace "αrepresents" with --α represents--.

Signed and Sealed this
Seventeenth Day of September, 2013

Teresa Stanek Rea
*Deputy Director of the United States Patent and Trademark Office*